Figure 1:
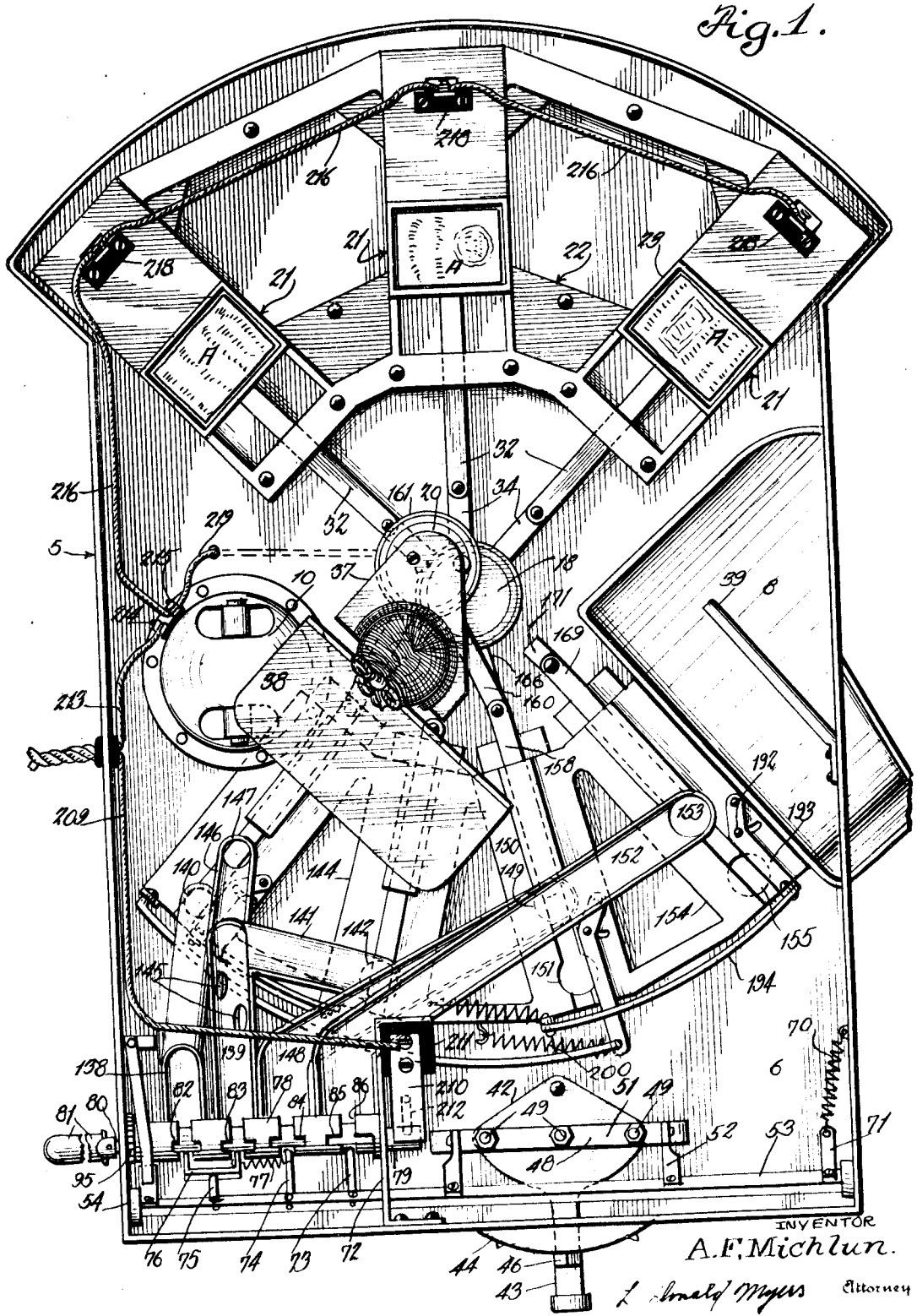

March 20, 1934.  A. F. MICHLUN  1,951,486
DISPENSING MACHINE
Filed June 25, 1930    11 Sheets-Sheet 6

Inventor
A. F. Michlun.
L. Donald Myers
Attorney

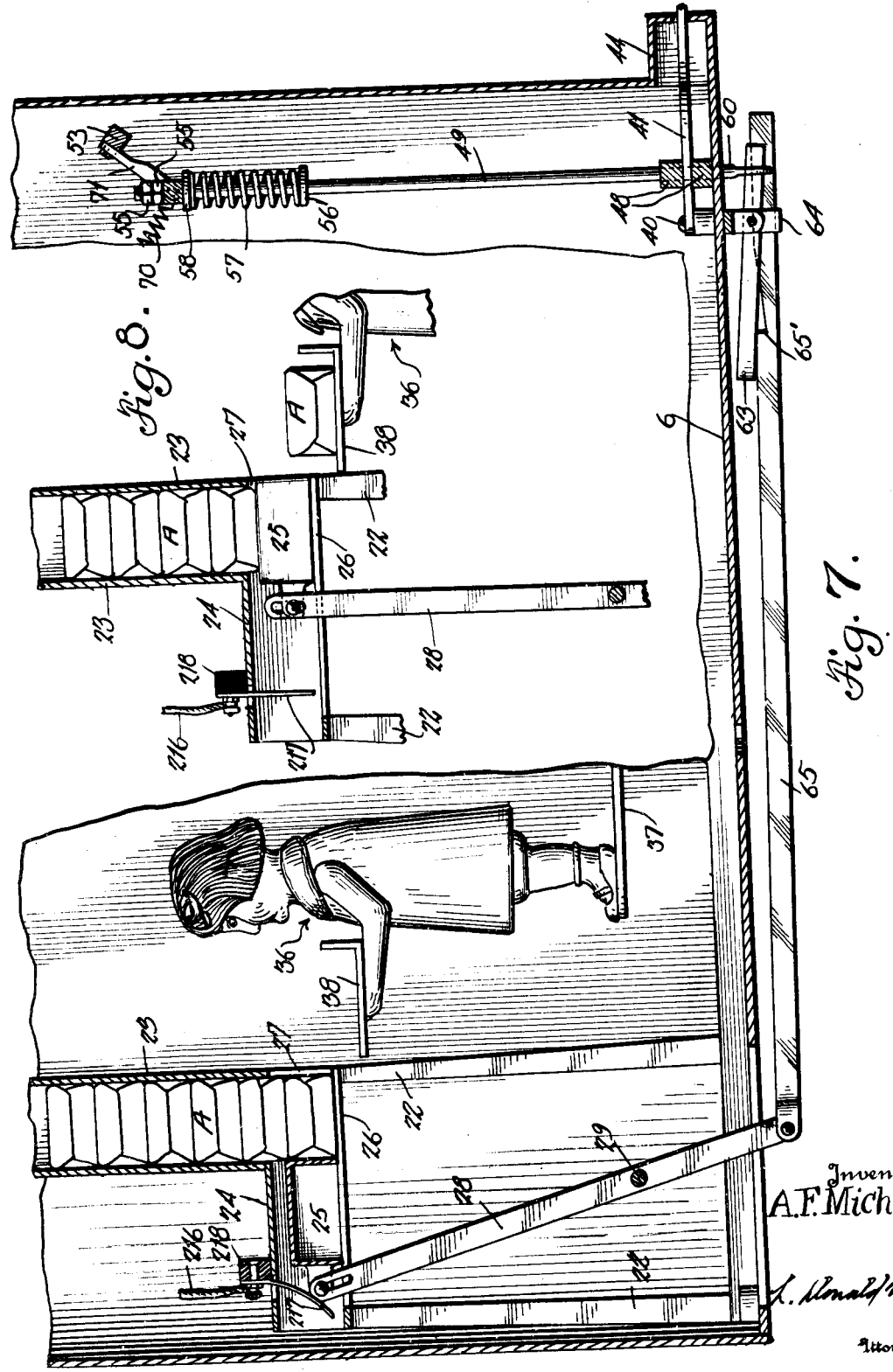

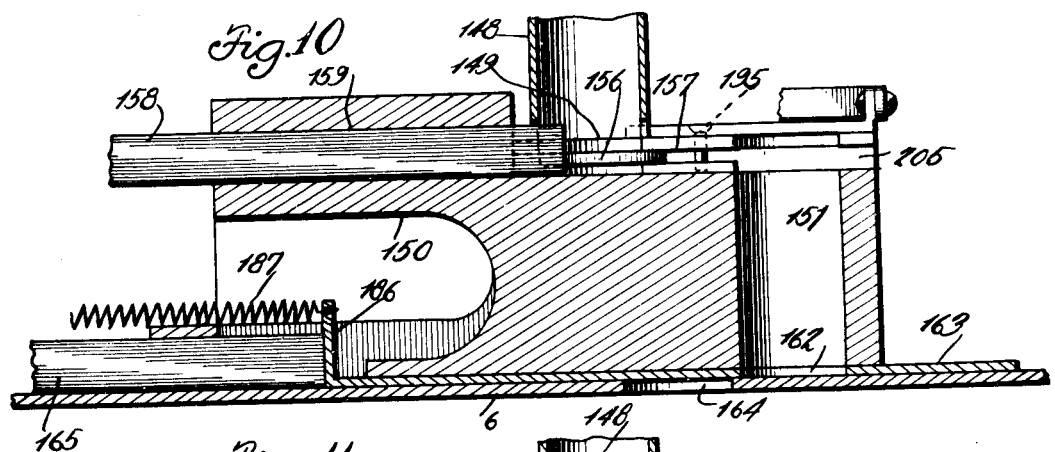
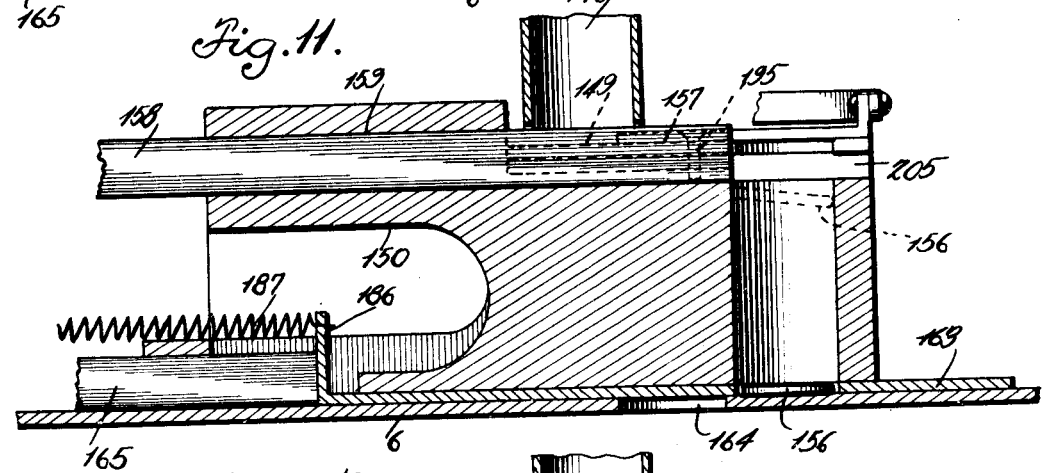
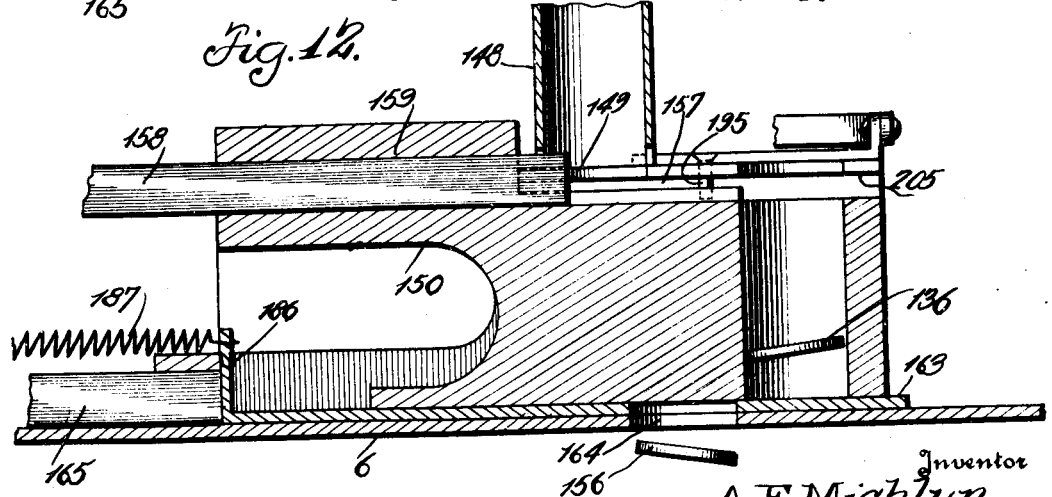

March 20, 1934.   A. F. MICHLUN   1,951,486
DISPENSING MACHINE
Filed June 25, 1930   11 Sheets-Sheet 10
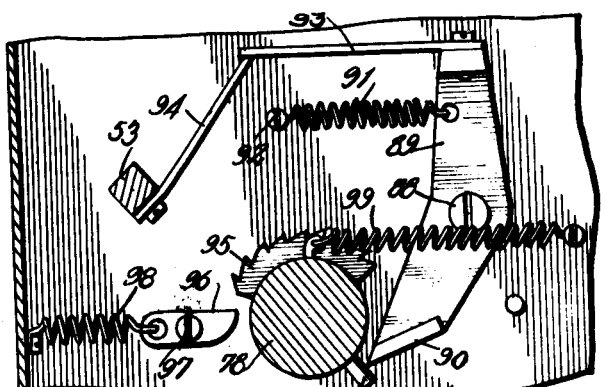
Fig. 18.
Fig. 22.   Fig. 23.
Fig. 19.
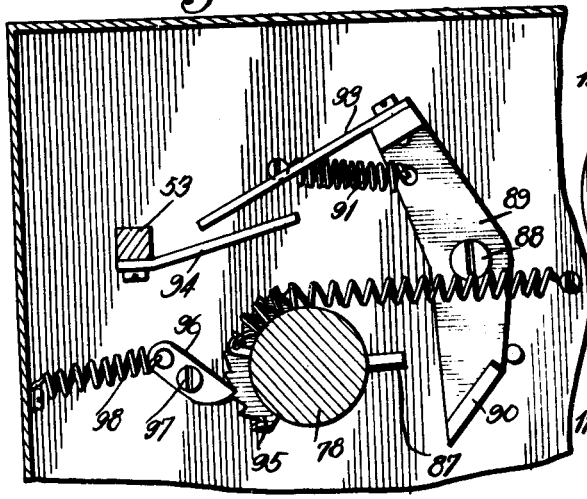
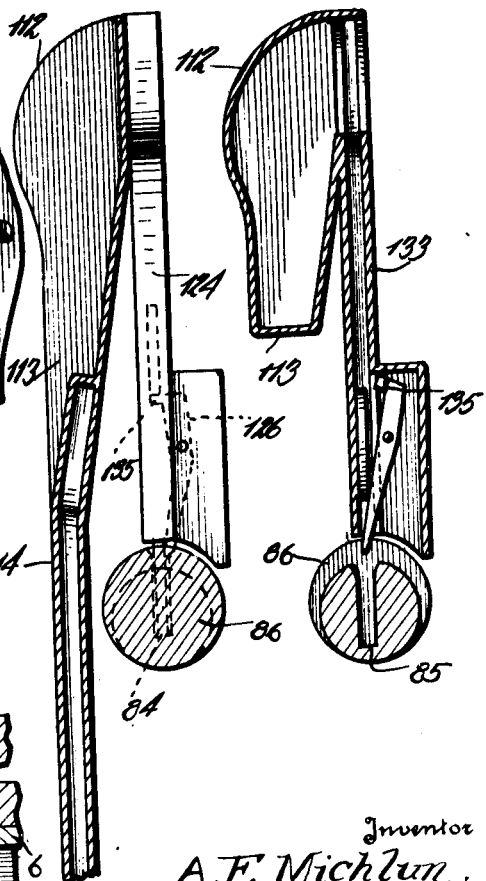
Fig. 20.
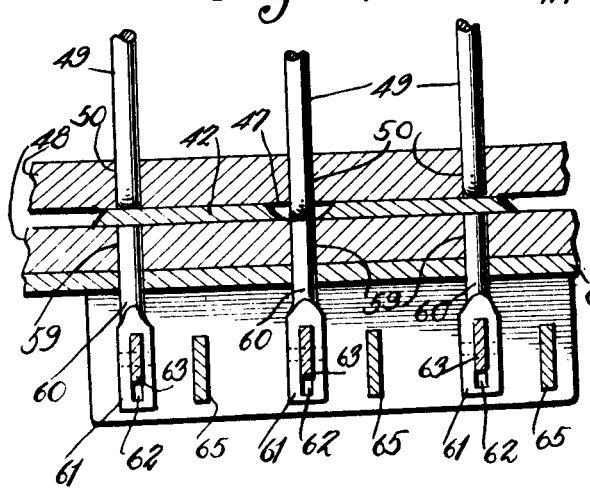
Inventor
A. F. Michlun.
L. Donald Myers
Attorney March 20, 1934.  A. F. MICHLUN  1,951,486
DISPENSING MACHINE
Filed June 25, 1930  11 Sheets-Sheet 11
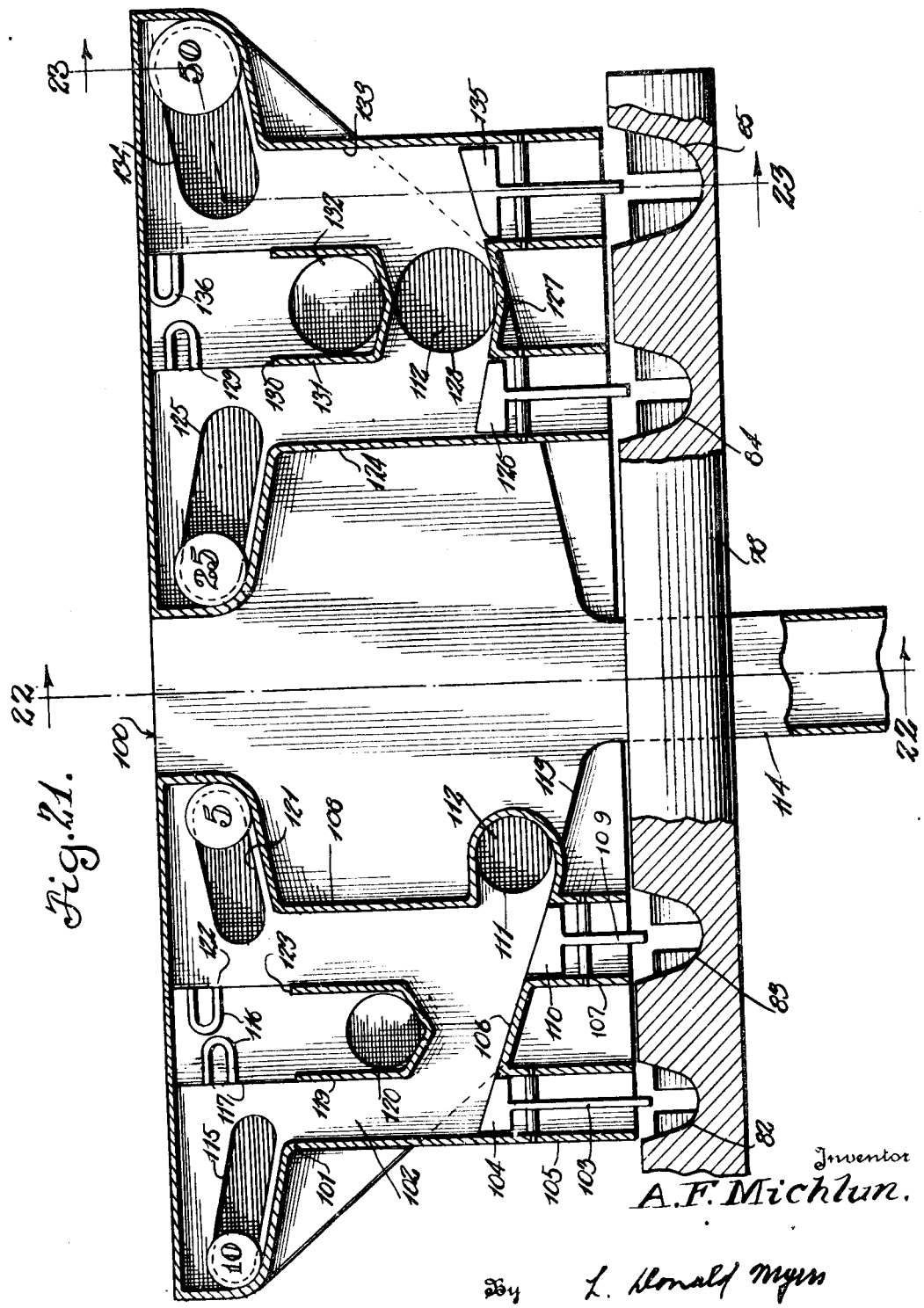

Patented Mar. 20, 1934

1,951,486

UNITED STATES PATENT OFFICE 1,951,486

DISPENSING MACHINE

Andrew F. Michlun, North Andover, Mass.

Application June 25, 1930, Serial No. 463,701

30 Claims. (Cl. 194—63)

This invention relates to new and useful improvements in dispensing machines and deals more specifically with coin controlled mechanism adapted to automatically dispense a pre-selected article and to give change, if a coin or coins of greater value than the purchase price of the selected article are placed in the machine.

The primary object of the invention is to provide mechanism which is coin controlled and which will automatically deliver to a customer a pre-selected article.

A further object of the invention is to provide selector mechanism by means of which the customer may pre-select the article desired and by depositing a coin or coins equal to or in excess of the value of the selected article and actuating a coin controller mechanism set the selector mechanism for the delivery of the desired article.

A still further object of the invention is to provide coin controller mechanism which will function to set the selector mechanism and start the prime mover which actuates the delivery mechanism only in case a coin or coins equal to or in excess of the value of the selected article are deposited in the coin controller mechanism.

Another object of the invention is to provide change making mechanism which is operated by the aforementioned prime mover simultaneously with the operation of the delivery mechanism and which will deliver to a customer a coin or coins covering the difference between the purchase price of a selected article and the value of the coin or coins deposited in the machine.

More specific objects of the invention are to provide housing means for the various different articles to be dispensed by the machine, the housing means being under the control of the selector mechanism whereby the proper article will be withdrawn from the housing means by the delivery mechanism and delivered to the customer; to provide delivery mechanism including a plurality of ejector devices for the housing means which will eject a selected article to a deliverer, common to all of the ejector devices, for conveyance of the ejected article to a point of delivery to the customer; to provide a selector mechanism which is manually controlled and automatically set by a coin controller mechanism and which will set the proper ejector device of the delivery mechanism for delivering the desired article; to provide a coin controller mechanism which receives the coins and through the medium of the coin or coins operates the selector mechanism; to provide coin changing mechanism which receives the coins from the coin controller mechanism, stores the coins according to their respective values in readiness for making change, and automatically delivers to the customer the proper change; to provide a coin handling mechanism which delivers proper coins to the coin controller mechanism, withholding excess and improperly deposited coins and slugs and returning them to the customer; to provide a prime mover which supplies power for operating the delivery mechanism and the coin changing mechanism; and to provide suitable circuits and controls for the prime mover.

Figure 2:
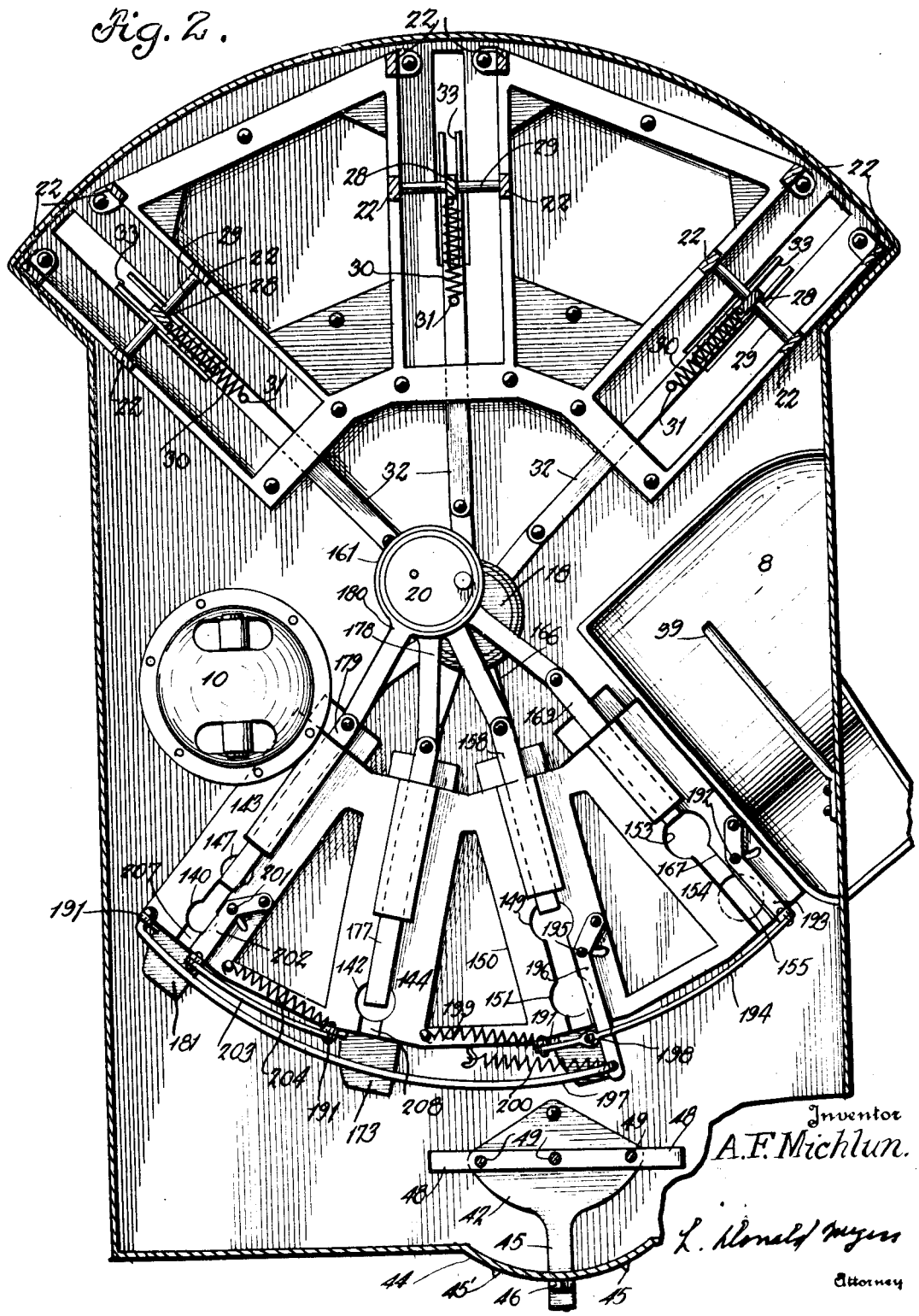
Figure 3:
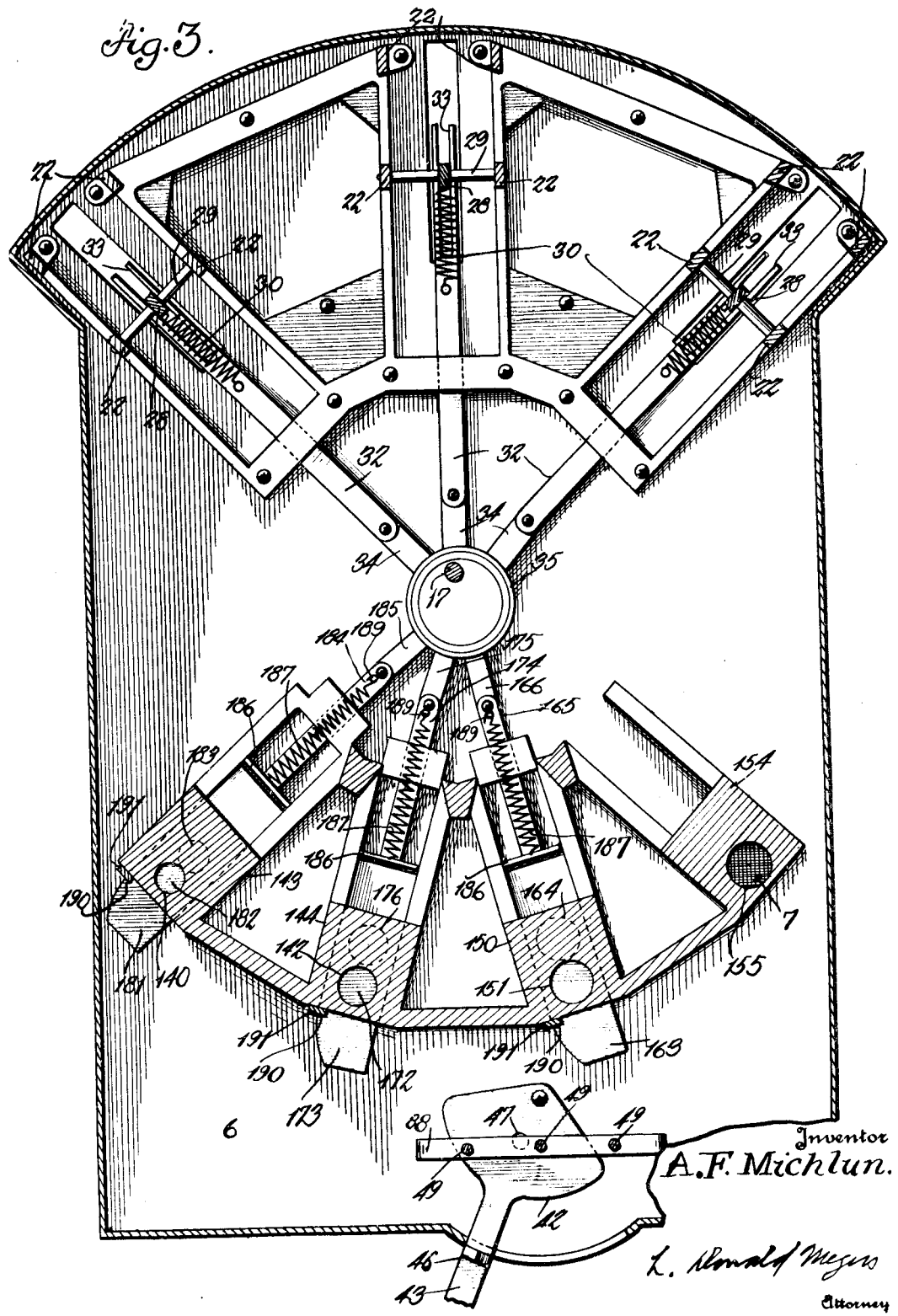
Figure 4:
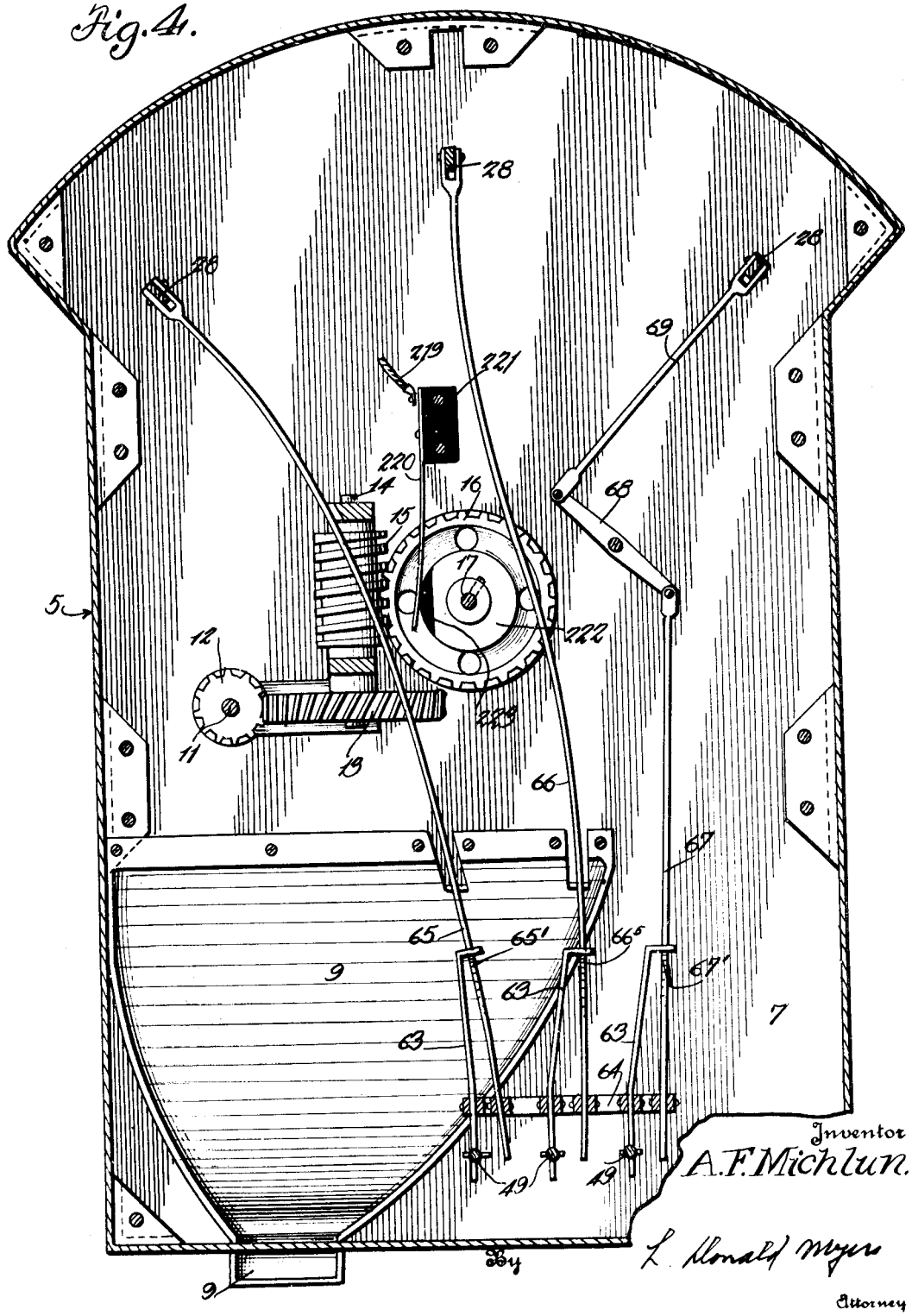
Figure 5:
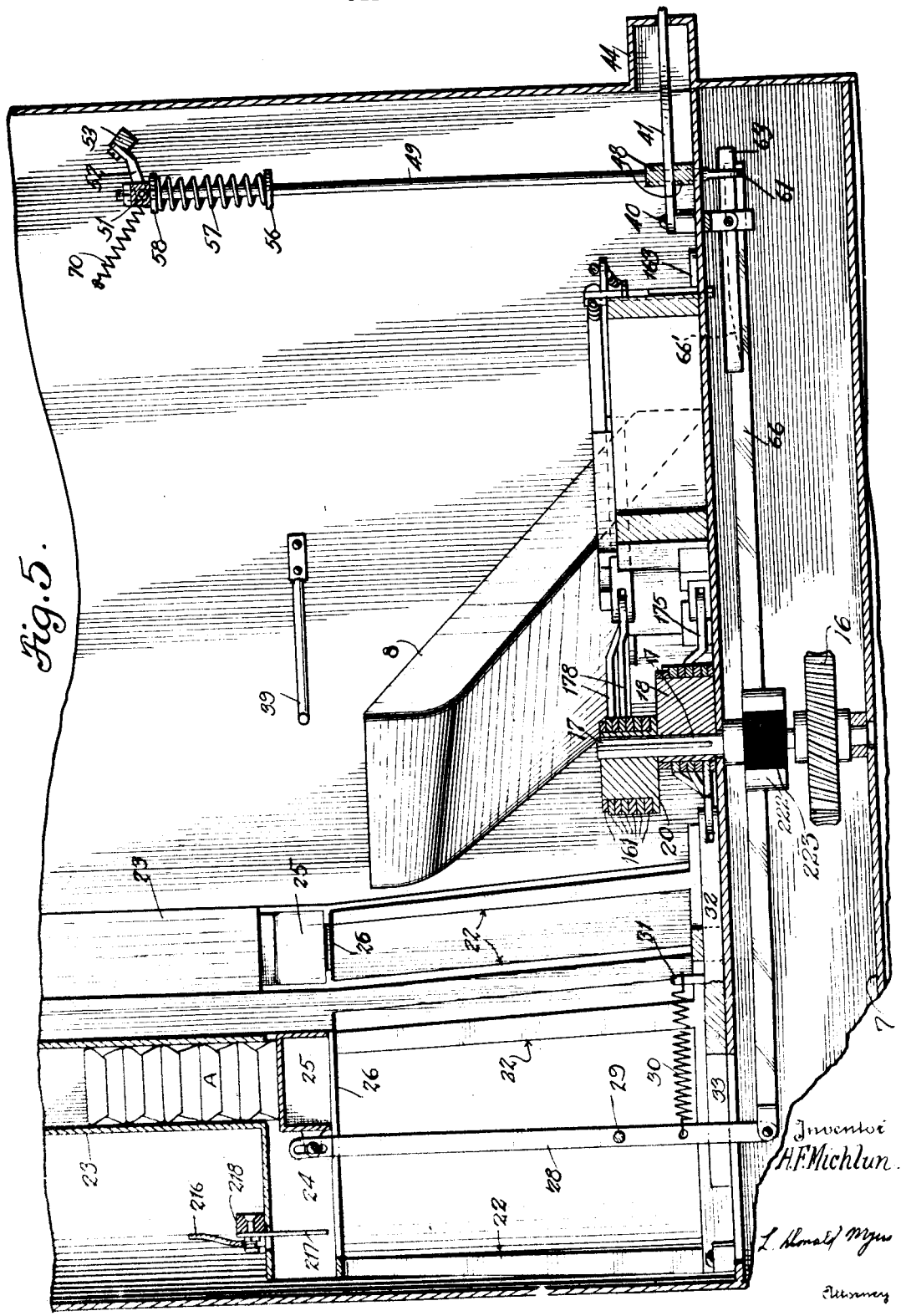
Figure 6:
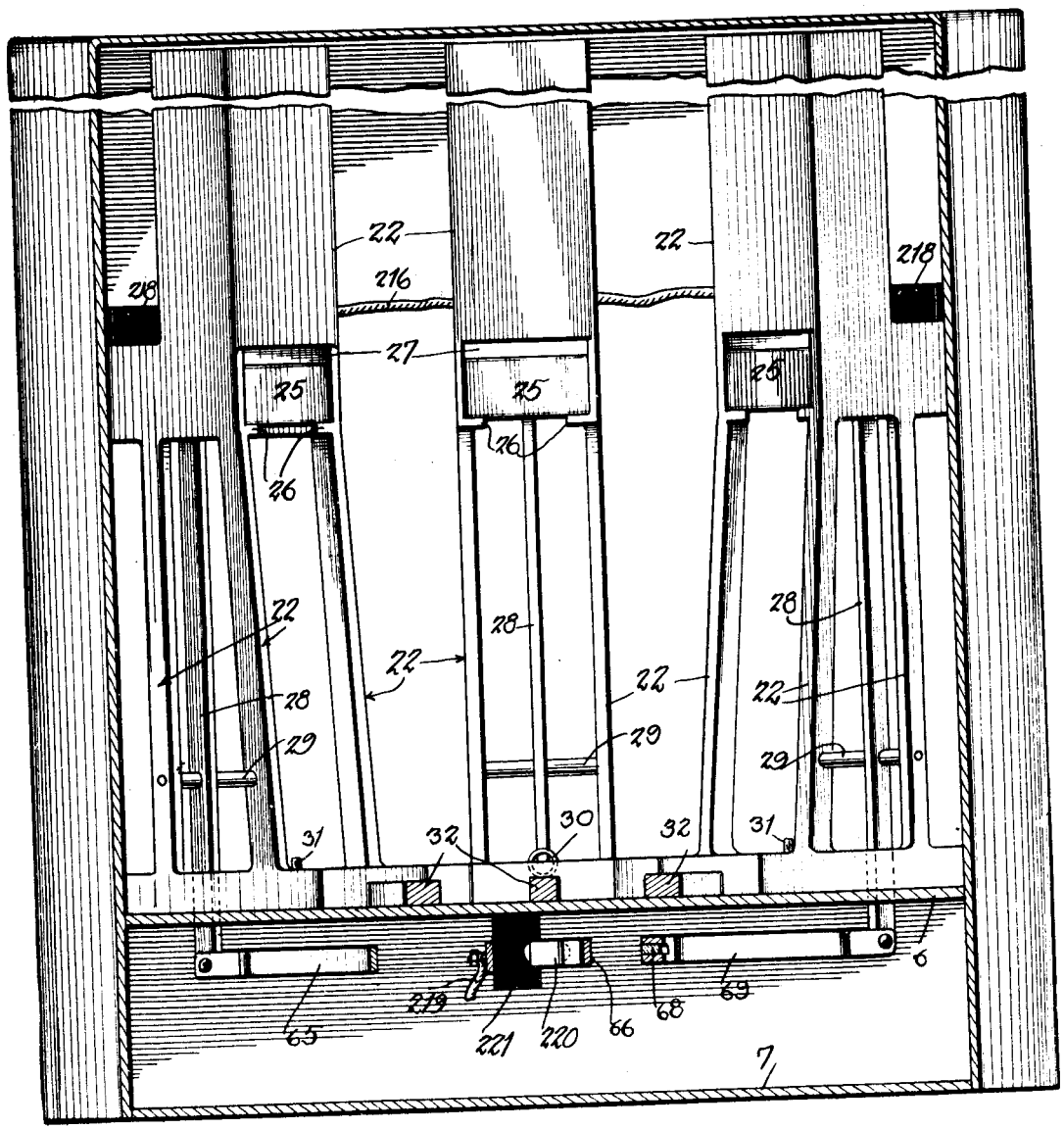
Figure 9:
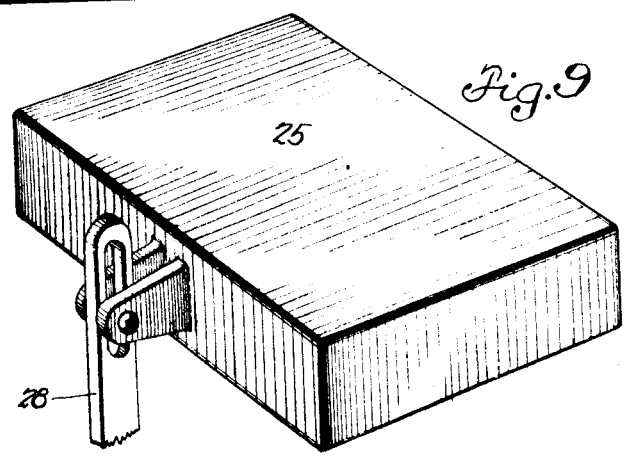
Figure 13:
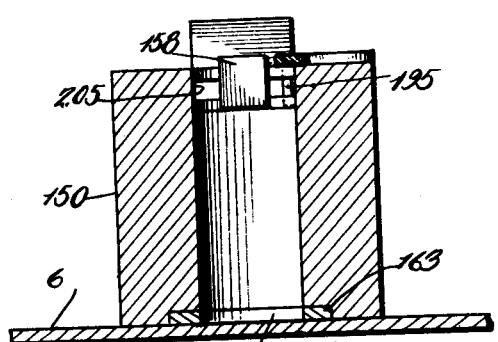
Figure 14:
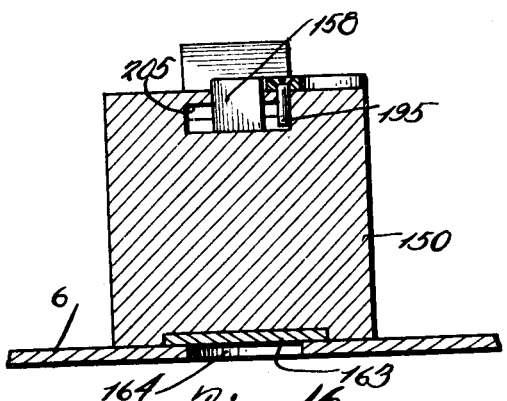
Figure 15:
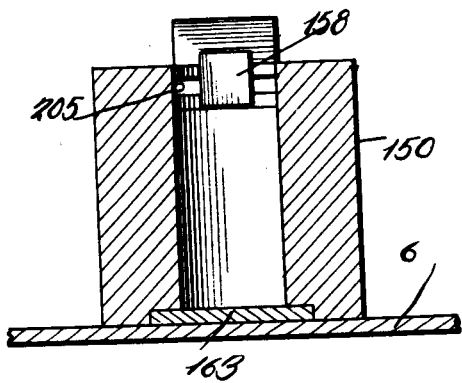
Figure 16:
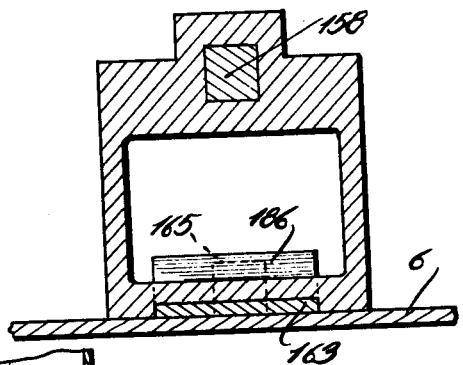

Other objects and advantages of the invention will be apparent during the course of the following description:

In the accompanying drawings forming a part of this specification and in which like numerals are employed to designate like parts throughout the same, Figure 1 is a top plan view of the dispensing machine embodying this invention, Figure 2 is a horizontal sectional view through the machine disclosed in Fig. 1, Figure 3 is another horizontal sectional view of the machine taken at a lower point than that disclosed in Fig. 2, Figure 4 is a horizontal sectional view of the machine and taken below the base disclosed in Figs. 1 to 3, inclusive and which prevents the illustration of the mechanism disclosed in Fig. 4 in these former figures, Figure 5 is a vertical sectional view of the machine, Figure 6 is a vertical sectional view of the machine taken substantially at right angles to the sectional view shown in Fig. 5, Figure 7 is a vertical sectional view somewhat similar to Fig. 5 but illustrating one step in the delivering of an article from one of the various storage compartments, Figure 8 is a detail vertical sectional view disclosing a subsequent step in the delivering of an article, Figure 9 is a detail perspective view of a portion of one of the ejector devices, Figures 10 to 17, inclusive, disclose detail vertical sectional views of a portion of the coin changing mechanism.

Figures 18 and 19 are detail views partly in section and partly in elevation of holding means for the coil controller mechanism, Figure 20 is a detail sectional view of a portion of the selector mechanism, Figure 21 is a vertical sectional view of the coin handling mechanism, Figure 22 is a sectional view of the coin handling mechanism taken on line 22—22 of Fig. 21, and Figure 23 is a vertical sectional view of the coin handling mechanism and taken on line 23—23 of Fig. 21.

In the drawings, wherein for the purpose of illustration is shown a preferred embodiment of the invention, the numeral 5 designates in its entirety the side wall portions of a casing which encloses the dispensing mechanism of the machine. I do not desire to limit myself to any particular form of casing but have only illustrated structure which is adapted for housing the mechanism illustrated. This casing has mounted therein a base 6 which supports a great deal of the mechanism. This base is suitably secured to the side walls of the casing 5 in any desired manner. Below the base 6 and substantially parallel thereto is a floor 7 which cooperates with the walls of the casing and base 6 to form a compartment.

The casing 5 further includes an article delivery chute 8 located at any convenient point but illustrated in the present embodiment as being positioned at one side of the casing. A coin delivery chute 9 also is provided in the casing and preferably is located between the base 6 and the floor 7 for delivering change, excess and improperly deposited coins, and slugs to the customer.

A prime mover and transmission mechanism are provided for operating certain portions of the machine. The prime mover 10 is mounted in any suitable manner upon the base 6 and has an armature shaft 11 projecting through the base to the compartment formed therebelow. This shaft has suitably keyed thereto a worm 12 meshing with a worm wheel 13 mounted on an intermediate shaft 14 which carries a second worm 15. The second worm meshes with a worm wheel 16 which is suitably keyed to a perpendicular shaft 17 extending through a suitable aperture formed in the base 6. The projecting end of this perpendicular shaft 17 has mounted thereon eccentrics 18 and 20 which are keyed to the shaft 17. The circuit and its switches for the prime mover 10 will be described at a later point in view of the fact that they are associated with other units of the machine in such a manner that a detailed description of the switches cannot be conveniently developed at this point.

Housing means for a plurality of different articles is provided and consists of any desired number of compartments 21 interconnected and braced by a supporting framework designated in its entirety by the reference character 22. It is to be understood that these compartments may be of any desired size or shape and may be arranged with respect to each other in the most convenient manner. In the present embodiment, they are illustrated as being radially associated with the perpendicular transmission shaft 17. Each compartment 21 includes a perpendicularly extending article receiving portion 23 and a horizontally extending base portion 24 which is in the form of a compartment for receiving a portion of an ejector device, one of which is associated with each compartment. Delivery mechanism is provided for ejecting a selected article from its respective storage compartment, conveying the article to the delivery chute 8, and transferring the article from the conveying means to the said chute. This mechanism includes an ejector device for each compartment; means for operating the ejector devices, said means being actuated by the prime mover through the transmission mechanism, and a deliveror common to all of the ejector devices.

The ejector devices for each compartment are identical and for this reason only one device will be specifically described. Slidably positioned within the portion 24 of the compartment is an ejector plunger 25 which normally is intended to be positioned as shown in Figs. 5 and 8, or directly beneath the perpendicularly extending portion 23 of the storage compartment. The ejector plunger 24, when in this position, supports the stack of articles arranged in the portion 23 of the compartment. Upon the selecting of the article desired, certain selector mechanism, to be described at a later point, is operated for setting the ejector plunger 25 in the proper compartment. This setting of the plunger causes the same to assume the position shown in Fig. 7 whereupon the weight of the stack of articles (A) causes all of the articles to drop until they rest upon the flanges 26 at the bottom of the storage compartment. Forward movement of the ejector plunger 25 will expel or discharge the bottom article laterally through an opening 27 in a wall of the storage compartment as best illustrated in Fig. 8.

The ejector plunger 25 is pivotally connected to the upper end of a lever 28 pivoted at 29 to the framework 22 of the article housing means. Figs. 2, 3 and 5 disclose the lever 28 as having connected to the lower portion thereof a spring 30 which in turn is connected to a pin 31 carried by a tappet 32. The inner end of the tappet is longitudinally slotted at 33 for receiving the lower end of the lever 28. The remaining end of the tappet 32 is pivotally connected to the arm 34 of a collar 35 which surrounds the eccentric 18 for being operated thereby.

The slot 33 in the end of the tappet 32 is of proper length to permit the tappet to reciprocate under the influence of the eccentric 18 without the tappet engaging the lever 28 when the ejector plunger 25 is in the position illustrated in Figs. 5 and 8. When the ejector is set so that the plunger 25 occupies the position illustrated in Fig. 7, or at the rear portion of the compartment base 24, longitudinal movement of the tappet 32 under the influence of the eccentric 18 will cause the inner end of the slot 33 to engage the lower end of the lever 28 for pivoting the latter upon its support 29 to move the ejector plunger 25 from the rearward position to the forward position, which movement ejects an article from the storage compartment.

A deliveror common to all of the storage compartments and their respective ejectors consists of an object 36, which in this embodiment is intended to simulate a sales girl. This object 36 is mounted upon a base 37 suitably secured to the eccentric 20 so as to rotate or travel in a circle around the axis of the perpendicular shaft 17. This object 36 supports a tray 38 which, during the travel of the object, passes in front of each one of the openings 27 in the various storage compartments. The eccentric 18 times the movements of the respective tappets 32 so that an article will be ejected from the compartment having its ejector set for delivering an article as the tray 38 passes in front of the opening 27 in that compartment. The object with its tray 38 continues to move after receiving the ejected article, as illustrated in Fig. 8, until the object again arrives at the position illustrated in Fig. 1. During this movement, the tray passes over the article delivery chute 8 where the transfer bar 39 pushes the article off of the tray into the delivery chute.

Selector mechanism is provided for permitting the customer to select the article desired. This selector mechanism is probably best illustrated in Figs. 1, 5, 7 and 20. Pivoted at 40 to the base 6 is a selector lever 41. This lever includes a sector shaped portion 42 and a handle 43. The handle projects outwardly of the front wall of the casing 5 through a slot formed in an arcuate projection 44 of the casing. The arcuate wall of this projection 44 may have suitable indicia, such as is designated in a general way by the points 45 in Fig. 2. This indicia 45 indicates the various operative positions of the lever handle 43 which carries a pointer 46. In the present embodiment of the invention, three storage compartments for different articles have been illustrated. For this reason, the handle 43 may assume three different operative positions. In Fig. 20, the sector shaped portion 42 of the selector lever is illustrated as having an aperture 47 formed therein substantially in alignment with the pivot 40 and the lever handle 43. This sector shaped portion 42 slides between a pair of supporting bars 48 through the upper one of which the three perpendicular rods 49 extend. The lower ends of these rods are positioned in apertures 50 formed in the upper supporting bar 48. These three rods extend perpendicularly in parallelism with each other and at their upper end portions pass through a bar 51 which is supported by arms 52 carried by a rock shaft 53 journaled at its opposite ends in bearings 54 formed preferably in the side walls of the casing 5. The upper extremities of the rods 49 have stops 55 which in the present embodiment consist of nuts threaded to the upper ends of these rods. As illustrated in Figs. 5 and 7, each rod has secured thereto adjacent its upper end a shoulder 56. This shoulder is fixed with respect to the rod and acts as a support for the lower end of a spring 57. The upper end of this spring bears against a sliding shoulder or washer-like member 58 which is positioned upon the rod 49. Each one of the rods 49 is provided with this spring mechanism 56—57—58. The sliding shoulders 58 on the rods 49 all bear against the lower surface of the bar 51.

Slidably positioned within apertures 59 formed in the lower support 48 are rod tappets 60. There are three of these tappets and they are positioned in true alignment with respect to the rods 49, one of the tappets being provided for each rod. The lower end of each rod tappet 60 is provided with a flattened head portion 61 which is slotted at 62. It will be noted that the rod tappets 60 project downwardly through apertures formed in the base 6 so that the flattened ends 61 are positioned below this base.

Loosely projecting through the slot 62 of each one of the rod tappets 60 is one end of a latch 63. Figure 4 discloses these three different latches and their relative positions with respect to each other. These latches are pivoted to a support 64 which is secured to the base 6. This support 64 has slidably extending therethrough a setting rod 65 which extends rearwardly along the base 6 to be pivotally connected to the lower end of the lever 28 which forms a part of the ejector mechanism for the compartment disclosed at the left in Fig. 1. A second setting rod 66 has one end slidably supported by the member 64 and this setting rod 66 extends to and is pivotally connected with the lower end of the ejector lever 28 associated with the middle storage compartment. The setting rod for the ejector lever associated with the right hand storage compartment 21 consists of a section 67 which is pivoted to one end of a rocker 68. The remaining end of this rocker has a section 69 pivoted thereto and the free end of this section 69 is connected to the ejector lever 28. In Figs. 5 and 7, the setting rods 65 and 66 are illustrated as having formed therein notches 65' and 66' respectively. All of the setting rods have suitable notches and these notches are operatively associated with the latches 63 so that when the various latches occupy the notches, the setting rods will be retained in their proper positions for holding the ejector plungers 25 in the positions illustrated in Figs. 5 and 8, or directly beneath the perpendicular portions 23 of the storage compartments.

In Fig. 20, the sector shaped portion 42 of the selector lever is illustrated with the aperture 47 positioned so that the middle rod 49 engages the upper end of its respective rod tappet 60. If the lever is actuated by movement of the handle 43 to the left, the beveled edge of the aperture 47 causes the middle rod 49 to ride upwardly out of the aperture and when the lever handle 43 has assumed its left hand operating position, the sector shaped portion 42 of the lever has been moved so that the aperture 47 is out of alignment with the middle rod 49 and its tappets 60 while the right hand edge of the sector 42 has been moved to the left of the right hand rod 49 which will permit this latter rod to engage its respective tappet 60. If the selector lever handle is moved to the extreme right hand operative position, the beveled right hand edge of the sector 42 will cam the right hand rod upwardly so that it will ride upon the top surface of the sector and block downward movement of the right hand rod toward its tappet. This movement of the sector 42 to the right will cause it to pass through the position illustrated in Fig. 20 wherein the middle rod 49 has been permitted to move down into engagement with its tappet 60. The continued movement of the sector 40 until the selector handle 43 assumes its extreme right hand position, causes the camming left hand edge of the aperture 47, as illustrated in Fig. 20, to cam the middle rod upwardly and as the aperture 47 moves to the right of the middle rod 49, this latter rod will ride upon the upper surface of the sector. The movement of the sector to the right continues until the left hand edge of the sector passes to the right of the left hand rod 49 which permits this rod to drop into engagement with its tappet 60. Movement of the sector 42 to the left causes the camming left hand edge of the sector to move the left hand rod up out of engagement with its tappet 60 so that this left hand rod will ride upon the top face of the sector. This control of the rods 49 by the selector lever determines which one of the ejector devices is to be operated.

The rock shaft 53 which carries the bar 51 associated with the upper ends of the rods 49, is retained normally in a position so that the bar 51 engages against the stops 55 carried by the upper ends of the rods 49. This normal position of the rock shaft 53 is maintained by the spring 70 which is connected at one end to the casing 5 and at its other end to an arm 71 carried by the rock shaft 53. This rock shaft extends entirely across the front portion of the casing and passes through a bearing plate 72. Between the bearing plate 72 and the left hand side wall of the casing 5, the rock shaft 53 is provided with a pin 73 adjacent the bearing plate 72, a pin 74 spaced to the left of the pin 73, and a relatively short pin 75 which has pivoted to its free end a substantially U shaped yoke 76. A spring 77 connected to the pin 74 and one side arm of the yoke 76 maintains this yoke in its normal position, which is with its opposite sides in alignment with the pins 73 and 74.

A coin controller mechanism, which will be described in detail at a later point, is employed for rocking the shaft 53 through the medium of one of the pins 72, 74 or 75. This rocking of the shaft 53 causes the arms 52 to move the bar 51 downwardly longitudinally of the rods 49. When the selector lever is in one of its operative positions, one of the rods 49 will be permitted to move downwardly with its tappet 60. This free rod 49 will be moved downwardly when the bar 51 is moved downwardly by the rock shaft 53. The connection between the bar 51 and the free rod 49 is through the spring 57 carried by this rod. The rods 49 which are not permitted to move downwardly, remain stationary, and the bar 51 is permitted to move relative to these stationary rods due to the springs 57 on the stationary rods acting as the transmission means between the bar 51 and the rods 49. It will be understood that the rod 49 which is permitted to move downwardly, due to the setting of the selector lever, will actuate its latch 63 for releasing the proper setting rod 65, etc. to set the proper ejector device.

Figs. 1, 18, 19, 21, 22 and 23 disclose coin controller mechanism which is manually actuated and which functions, through the medium of deposited coins, to actuate the selector mechanism. This coin controller mechanism includes a shaft 78 which is journaled at the end 79 in the bearing member 72 and at the end 80 in a side wall of the casing 5. This end 80 has suitably fastened thereto a crank handle 81 by means of which the shaft 78 may be rotated. This shaft is provided with a plurality of longitudinally extending pockets 82, 83, 84 and 85 adapted for receiving respectively ten cent pieces, five cent pieces, twenty-five cent pieces, and fifty cent pieces. Extending around the shaft 78 at the middle portion of each one of these pockets 82 to 85, inclusive, is a groove 86, the function of which will be explained at a later point.

In Figs. 18 and 19, the shaft 78 is illustrated as having associated therewith a plurality of devices which function to prevent undesired movement of the shaft. A pin 87 projects radially from the shaft adjacent the side wall of the casing. Pivoted to the side wall, as at 88, is a catch 89 having an end 90 adapted to engage the pin 87 for preventing rotation of the shaft 78 in a counterclockwise direction, as illustrated in Figs. 18 and 19. A spring 91 is connected to the opposite end of the wall of the casing, as at 92. This same end of the catch is provided with an arm 93 adapted normally to be engaged by an arm 94 carried by the adjacent end of the rock shaft 53. The engagement of these arms 93 and 94 function to prevent movement of the catch under the influence of the spring 91 until movement of the rock shaft 53 occurs, as illustrated in Fig. 19, which causes the arm 94 to move downwardly. This downward movement of the arm 94 releases the catch 89 and permits the latter to pivot for disengaging its end 90 from the pin 87.

The shaft 78 also is provided with an arcuate shaped ratchet 95 adapted to cooperate with a pivoted pawl 96 supported at 97 upon the wall of the casing. A spring 98 functions to normally retain the pawl in the position illustrated in Fig. 18.

When the coins are deposited in the coin controller shaft 78, they occupy one or more of the pockets 82 to 85, inclusive, depending upon the number of coins deposited. If a quarter is placed in the pocket 84, and the shaft 78 rotated in a counterclockwise direction, as viewed in Figs. 18 and 19 through the medium of the crank handle 81, the quarter will act as a connection between the shaft 78 and the rock shaft 53 due to the fact that the pin 74 on this rock shaft projects into the groove 86 formed in the shaft 78 at the region of the pocket 84. Rotation of the controller shaft 78 causes the rock shaft 53 to pivot for actuating one of the rods 49 forming part of the selector mechanism. The same action occurs if a fifty cent piece is deposited in the pocket 85.

Due to the fact that this dispensing machine, in its present embodiment, is adapted for dispensing articles valued at fifteen cents, at least a nickel and a dime must be deposited in the machine before the controller shaft 78 can be rotated to actuate the rock shaft 53. As will be developed at a later point in connection with coin handling mechanism, it is impossible to deposit anything but a dime in the ten cent pocket 82. Either a dime or a nickel may be deposited in the five cent pocket 83. Nothing but a quarter can be deposited in the pocket 84 and nothing but a fifty cent piece can be deposited in the pocket 85. With a dime in the pocket 82 and either a nickel or a dime in the pocket 83, rotation of the controller shaft 78 will cause these two coins to engage both arms or branches of the yoke 76 and rotation of the shaft 78 will cause the rock shaft 53 to be operated. If there is not a coin in each one of the pockets 82 and 83, rotation of the controller shaft 78 will only cause the yoke 76 to pivot upon the end of the pin 75 and no connection will be established between the two shafts 78 and 53.

It is to be understood that sufficient play is provided between the arms 93 and 94 and the catch 89 and pin 87 to permit sufficient initial rotation of the shaft 78 for causing downward movement of the arm 94 to permit the catch 89 to be disconnected from the pin 87. During proper rotary movement of the shaft 78, the ratchet 95 will engage the free end of the pawl 96 and will ratchet downwardly past this pawl until the extreme upper or right hand end of the ratchet passes below the pawl when the spring 98 will return the pawl to its original position and upon return movement of the shaft 78, the ratchet will slide over the surface of the curved pawl. This pawl and ratchet structure functions to prevent partial rotation of the controller shaft 78 for this shaft must be moved, after once being started, a sufficient distance to cause the ratchet to pass below the pawl. It will be understood, therefore, that a person will not be permitted to rock the controller shaft 78 backwardly and forwardly a limited amount for the purpose of repeatedly actuating the rock shaft 53 by means of a single coin.

A spring 99 is connected to the controller shaft 78 at one end and to the casing at its remaining end and operates to return the controller shaft 78 to its original or starting position.

It will be understood that the selector rock shaft 53 cannot be operated unless a proper coin or proper coins have been deposited in the pockets of the controller shaft 78 and for this reason the rock shaft 53 is dependently coin controlled.

Coin handling mechanism is illustrated in Figs. 21 to 23, inclusive, and functions to deliver proper coins to the coin controller mechanism. It also functions to withdraw slugs, excess coins and improperly deposited coins and returns them to the customer. This coin handling mechanism cooperates with the coin controller shaft 78. The coin handling mechanism consists of a casing structure designated in its entirety by the reference character 100. It is to be understood that this casing is suitably mounted upon the top or it may form a portion of the top of the casing 5. The casing 100 includes a conveying chute 101 for ten cent pieces. A dime deposited in this conveying chute 101 will travel downwardly through the chute portion 102 and will drop into the pocket 82 of the controller shaft 78. When the dime reaches the pocket 82, it will engage the depending finger 103 formed on the pivoted bridge 104. The dime will pivot the bridge for causing the latter to be moved to close off the portion 105 of the coin chute. If a second dime is deposited in the chute 101, it will travel down the portion 102 until it engages the bridge 104 which will cause this second dime to travel over the inclined surface 106 and drop in the portion 107 of the five cent conveyor chute 108. This portion 107 will conduct the second dime into the pocket 83 of the controller shaft 78. The coin in the pocket 83 will engage the depending finger 109 of the bridge 110. The deposited coin engaging the finger 109 will cause the bridge 110 to close off the part 107 of the chute 108. Should a third dime be deposited in the chute 101 while the first two dimes are still in the pockets 82 and 83, this third dime will travel down the chute 101 and over the compound inclined surface formed by the bridges 104 and 110 and the part 106 until this third dime reaches the discharge opening 111 through which it will pass into a rear compartment 112. This compartment is more or less funnel shaped and has a sloping bottom wall 113 which leads to a discharge manifold 114. This manifold 114 is intended to extend in any suitable manner, not shown, to the coin discharge chute 9, illustrated in Fig. 4.

A discharge opening 115 is provided in the upper portion of the chute 101 and functions to withdraw from this chute any coin deposited therein which is smaller than a ten cent piece. This opening 115 will cause this improper coin to drop into the compartment 112 and be returned to the customer by way of the manifold 114. Should a slug be deposited in the chute 101 it will travel down the inclined upper end portion of the same and will be attracted by the magnet 116 which will cause the slug to jump the entrance of the chute portion 102 and pass through the aperture 117 where it will be deposited in the recess 119. The bottom portion of this recess is formed with a hole 120 communicating with the compartment 112 so that the slug will be returned to the customer.

The five cent chute 108 also is provided with an elongated opening 121 similar to the opening 115 in the chute 101. This opening 121 will cause any coin smaller than a nickel to drop rearwardly into the compartment 112. Any slug deposited in the five cent chute 108 will be attracted by the magnet 122 and the slug will be caused to jump over the vertical portion of the chute 101 to pass through the opening 123 into the recess 119 out of which it will pass by way of the opening 120 into the return compartment 112.

If a customer deposits a five cent piece and a ten cent piece into the chutes 101 and 108 respectively, they will travel down their individual chutes and come to rest in the pockets 82 and 83. The coins in these pockets will actuate the bridge members 104 and 110 so that if a third coin is deposited in either one of the chutes 101 and 108, it will be side-tracked or fed through the opening 111 to the return compartment 112.

The coin handling mechanism further includes a twenty-five cent chute 124 which is provided with an opening 125 for causing coins smaller than a quarter to drop into the return compartment 112. A bridge 126 is provided for the chute 124 and this bridge 126 will be moved across the chute when a quarter is passed down the latter into the pocket 84 of the coin controller shaft 78. If a second quarter is deposited in the chute 124 while a quarter is occupying the pocket 84, the bridge 126 will transfer the second or excess quarter to the portion 127 where the excess quarter will drop through the opening 128 into the return compartment 112. The twenty-five cent chute 124 is provided with a magnet 129 and an opening 130 similar to the chutes 101 and 108 so that any slug deposited in the quarter chute will be attracted and caused to drop into the recess 131 where it will pass into the return compartment 112 through the opening 132.

A fifty cent chute 133 is provided and is formed with a small coin return opening 134 similar to the previously described coin chutes. A bridge 135 also is provided and is operated by a fifty cent piece deposited in the pocket 85 of the controller shaft 78. The operation of the bridge 135 will cause a second fifty cent piece to be guided to the part 127 where it will pass through the opening 128 into the return compartment 112. A magnet 136 associated with an opening 137 also is provided for the fifty cent chute 133 so that any slug deposited in this chute will be returned to the customer by way of the opening 132 and the return compartment 112.

It now will be seen that any excess coins deposited in any of the chutes will be returned to the customer as well as slugs and improperly deposited coins. The coin handling mechanism, therefore, prevents fraud and assures the proper disposition of any coins or slugs deposited in the machine.

This machine also includes coin changing mechanism which will automatically function to deliver to the customer a coin or coins equal in value to the difference between the purchase price of the selected article and the value of the coin or coins deposited in the machine. As stated in connection with the coin controller mechanism, this machine is designed to dispense articles at fifteen cents. It has been seen that the coin handling mechanism is operable to receive and deliver to the coin controller mechanism dimes, nickels, quarters, and fifty cent pieces. The coin changing mechanism, therefore, has been designed in this particular embodiment to handle the same valued coins. It is to be understood, however, that an additional coin chute might be added without departing from the spirit of the invention for handling silver dollars. This fact should be borne in mind while considering the coin changing mechanism.

When a ten cent piece has been deposited in the chute 101 and has been conducted to the pocket 82 in the shaft 78 and a nickel has been deposited in the chute 108 and conducted to the pocket 83 in the controller shaft 78, rotation of this shaft 78 by means of the handle 81 until all of the pockets 82 to 85, inclusive, are opening downwardly or on the bottom of the shaft 78 will cause the two coins in the pockets 82 and 83 to drop into the runways 138 and 139 respectively. The ten cent piece deposited in the chute 138 will be conducted to the point 140 where it will lie in a horizontal position in a circular recess, as best illustrated in Fig. 2. The five cent piece deposited in the runway 139 will travel along this runway into the branch 141 which will conduct it to the circular pocket 142, see Fig. 2. These pockets 140 and 142 are illustrated in Fig. 3 as extending downwardly through the castings 143 and 144 respectively. If two dimes have been deposited in the coin handling mechanism, it has been explained above that the second dime will be conducted into the five cent pocket 83 of the controller shaft 78. Upon rotation of the controller shaft, this second dime will be deposited in the runway 139 and will drop through either one of the apertures 145 in this runway. After passing through either one of the apertures, the second dime will drop into a runway 146 which will conduct it to the point 147 of the casting 143.

A twenty-five cent piece deposited in the pocket 84 of the controller shaft 78 will be deposited in the runway 148 upon rotation of the said controller shaft. This runway will conduct the twenty-five cent piece to the recess 149, see Fig. 2. This recess 149 is formed in a casting 150. This casting has a second recess 151 which extends entirely through the casting, as illustrated in Fig. 3.

A fifty cent piece deposited in the pocket 85 of the controller shaft will be dropped into the runway 152 and will be conducted by this runway to the point 153 of the casting 154. This casting also has a pocket 155 which extends entirely through the said casting.

In Figs. 10 to 16, inclusive, there has been illustrated in vertical section a casting which corresponds with the casting 150. The lower end of the chute 148 is illustrated as being capable of depositing a coin at the point 149. This coin, or twenty-five cent piece 156, see Fig. 10, occupies the opposed guideways 157 which extend from a point 149 to the recess 151.

A plunger 158 is slidable in the casting 150 through the opening 159. This plunger 158 is connected by means of an arm 160 to one of the collars 161 surrounding the eccentric 20 carried by the shaft 17, see Fig. 5. Rotation of the perpendicular shaft 17 will cause the eccentric 20 to reciprocate the plunger 158 both forwardly and backwardly a complete stroke during one cycle of operation of the machine. The forward movement of the plunger 158 will push the coin 156 through the guideways 157 until the coin reaches the recess 151. It will drop down this recess entirely through the casting 150 until it lies in the circular opening 162 formed in a plate 163 slidably positioned between the casting 150 and the base 6 of the casing 5. This base is provided with a discharge opening 164 located inwardly of the recess 151. The plate 163 is connected to a plunger 165 which in turn is connected to an arm 166 carried by one of the collars 35 surrounding the lower eccentric 18. If the plate 163 is moved inwardly through the operation of the eccentric 18, the coin in the opening 162 will be moved over to the opening 164 and this coin will drop through the latter opening into the coin return chute 9, shown in Fig. 4. This cycle of operation is illustrated in Figs. 10 to 12, inclusive.

Figure 17:
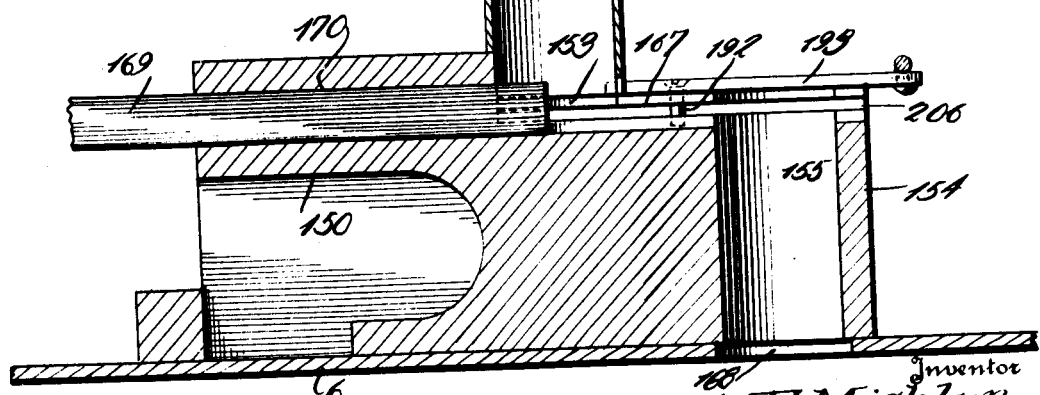

Fig. 17 illustrates the casting 154 with its recess 155 and the runway 152 which conducts a coin to the point 153. This casting also is provided with guideways 167 by means of which a coin deposited at the point 153 may be moved into the recess 155. This recess extends entirely through the casting 154 and is lined up with an opening 168 formed in the base 6. This opening 168, however, does not overlie the coin return chute 9 but causes a fifty cent piece moved into the recess 155 to drop into a coin box, not shown. This withdrawing of the fifty cent pieces from the coin changing mechanism is due to the fact that the fifty cent pieces are not to be used in making change. It is to be understood, however, that should the machine be designed to handle silver dollars, the casting 154 would be similar to the casting 150 illustrated in Figs. 10 to 16, inclusive. A plunger 169 is mounted in an opening 170 in the casting 154. This plunger is connected by an arm 171 to one of the collars 161 surrounding the eccentric 20. Reciprocation of the plunger 160 will cause a fifty cent piece deposited in the guideways 167 to be moved forwardly through these guideways until it reaches the recess 155.

The casting 144 is provided with a recess 142, which extends entirely through the casting in a manner identical with the recess 151 of the casting 150. A coin deposited in this recess 142 by the branch 141 of the runway 139 will drop down through the recess 142 and will be deposited in an opening 172 in a plate 173. This opening 172 in the plate 173 corresponds with the opening 162 in the plate 163 associated with the casting 150. This plate 173 is attached to a plunger 174 which in turn is pivotally connected to an arm 175 carried by one of the collars 35 surrounding the eccentric 18. Inward movement of the plate 173 will cause the coin positioned within this opening 172 to be moved inwardly until it registers with an opening 176 formed in the base 6. This opening 176 corresponds with the opening 164 associated with the casting 150. The five cent piece passing through the casting 144 in this manner and dropped through the opening 176 in the base 6 will be returned to the customer by means of the coin chute 9.

The casting 144 is provided with a plunger 177 which corresponds with the plunger 158 for the casting 150. This plunger 177 is connected to an arm 178 carried by one of the collars 161 surrounding the eccentric 20. Forward movement of the plunger 177 causes its front end to traverse the upper end of the recess 142, as illustrated in Fig. 2.

The casting 143 has associated therewith the runways 138 and 146 which deposit ten cent pieces respectively in the recess 140 or at the point 147. The ten cent piece deposited in the recess 140 by the runway 138 will drop down through this recess which corresponds with the recess 151 formed in the casting 150. The ten cent pieces deposited at the points 147 by the runway 146 will be received in guideways similar to the guideways 157 for the casting 150 and 167 for the casting 154. The plunger 179 slidably associated with the casting 143 is connected by an arm 180 with a ring 161 encircling the eccentric 20. During the complete rotation of this eccentric 20, the plunger 179 will be moved across the point 147 and the recess 140 in a similar manner to the movement described in connection with the plunger 177 for the casting 144.

Fig. 3 discloses the casting 143 as having a plate 181 which is formed with an aperture 182 registering normally with the recess 140. The base 6 is formed with an aperture 183 beneath the casting 143 and is adapted to permit the passage of a ten cent piece occupying the opening 182 in the plate 181 when this opening is placed in alignment with the aperture 183 due to the rearward or inward movement of the plate 181. A coin dropping through the aperture 183 will be returned to the customer by the coin chute 9. The plate 181 is connected to a plunger 184 which in turn is connected to an arm 185. This arm is carried by one of the collars 35 surrounding the eccentric 18.

It has been stated above that the plate 163 is connected to the plunger 165 while the plate 173 is connected to the plunger 174 and the plate 181 is connected to the plunger 184. The connection in each one of these instances consists of an upstanding flange 186, see Figs. 10 to 12, inclusive, formed on the inner end of each one of the plates 163, 173, and 181. Each one of these flanges 186 has connected to it one end of a spring 187. The other end of the spring 188 is connected to a part 189 of the various plungers. The springs 187 function to urge the plates toward the plungers 165, 174 and 184 so that the upstanding flanges 167, if the plates 163, 173 and 181 are free to move rearwardly, will abut against the outer ends of the plungers 165, 174 and 184 respectively.

Each one of these plates, 163, 173 and 181, is provided with a notch 190 which is normally occupied by a latch 191, see Fig. 3. These latches prevent reciprocatory movement of the plates 163, 173 and 181 when the said latches occupy the notches 190. With the latches in the positions illustrated in Fig. 3, the plungers 165, 174 and 184 will move inwardly or toward the shaft 17 independently of the plates and the outer ends of the plungers will be moved away from the flanges 186. If one of the plates is released, due to pivotal movement of its latch 191, the spring 187 associated with the released plate will cause the plate to follow the rearward movement of its respective plunger whereby the coin receiving opening in the moved plate will register with its respective opening in the base 6 for causing the coin carried by the plate to be dropped into the coin return chute 9.

The casting 154 adapted to handle fifty cent pieces, as described above, is provided with guideways 167 for guiding coins from the points 153 to the recesses 155. The plunger 169 will cause a coin to travel from the point 153 to the recess 155 during forward movement of the plunger. The travel of the coin through the guideways 167 will cause the coin to engage a pin 192, see Figs. 2 and 17, carried by a lever 193. Engagement of the coin with the pin 192 will cause the lever 193 to pivot to the right, see Fig. 2. The lever is connected by a link 194 with the latch 190 employed for holding the plate 163 associated with the casting 150.

By examining Figs. 10 to 12, inclusive, it will be seen that the casting 150 has a pin 195 normally passing through one of the guideways 157. This pin 195 is carried by a pivoted lever 196. The outer end of the lever 196 has attached thereto a link 197 which extends to the latch 191 associated with the plate 181 for the casting 143. The link 194 also is provided with a depending pin 198 which engages one side of the lever 196. A spring 199 is connected to the upper end of the latch 191 associated with the plate 163. This spring controls the operation of the lever 193 through the link 194. It also retains the latch 191 associated with the plate 163 in the notch 190 of this plate. A spring 200 is connected to the lever 196 and controls this lever and the link 197 for causing the latch 191 associated with the plate 181 to occupy the notch 190 formed in this plate.

The guideways for the casting 143 also have associated therewith a pin 201 carried by a lever 202. This lever is connected to a link 203 which extends to the latch 191 associated with the plate 173. A spring 204 controls the operation of the lever 202, the link 203, and the latch 191 associated with the plate 173 for retaining the latch in the notch 190 of this plate.

Due to the fact that the articles to be dispensed by this machine are valued at fifteen cents, when two ten cent pieces are deposited in the machine, five cents in change should be returned to the customer. The second ten cent piece will be conducted by the runway 146 to the point 147 of the casting 143. Forward or outward movement of the plunger 179 will move this second dime forwardly through the guideways formed in the casting 147 past the pin 201 carried by the lever 202. The engagement of the second dime with the pin 201 will cause the lever 202 to be pivoted in a direction to pivot the latch 191 associated with the plate 173 against the tension of the spring 204. This movement of the latch 191 will release the plate 173 and rearward movement of the plunger 174 will permit the spring 187 connected to the plate 173 to move the plate rearwardly so that its opening 172 will register with the opening 176 in the base 6. A five cent piece, therefore, will be returned to the customer.

When a quarter is deposited at the point 149 in the casting 150, the forward movement of the plunger 158 will cause the quarter to travel through the guideways 149 in the casting 150. The quarter when thus moved, will engage the pin 195 carried by the lever 196 which will move the lever in a direction to cause movement of the link 197 for pivoting the latch 191 associated with the plate 181. This movement of the latch 191 will release the plate 181 and rearward movement of its plunger 184 will permit the spring 187 to move the plate 181 for registering its aperture 182 with the aperture 183 formed in the base 6 for delivering the dime to the customer. The delivered dime constitutes the change from the deposited quarter.

When a fifty cent piece is deposited at the point 153 in the casting 154, forward movement of the plunger 169 will cause the fifty cent piece to pass through the guideway 167. The fifty cent piece will engage the pin 192 carried by the lever 193 and will cause movement of this lever. The lever 193 will move the link 194 which will pivot the latch 191 associated with the plate 163 for releasing this plate. The pin 198 carried by the link 194 will engage the lever 196 for pivoting this lever. Movement of the lever 196 will actuate the link 197 for operating the latch 191 associated with the plate 181 of the casting 143. Movement of this latter latch 191 will release the plate 181. After these plates 163 and 181 have been released from their latches 191 by the movement of a fifty cent piece through the casting 154, rearward movement of the plunger 165 for the plate 163 and the plunger 184 for the plate 181 will permit the springs 187 attached to these two plates to move the latter inwardly for causing a quarter to pass through the hole 164 in the base 6 and a ten cent piece to pass through the hole 183 in the base. The quarter and the dime, equaling thirty-five cents, constitute the change from the deposited fifty cent piece.

By examining Figs. 10 to 12, inclusive, and 17 it will be seen that the guideways 157 for the casting 150 and the guideways 167 for the casting 154 extend beyond the recesses 151 and 155 and open at 205 and 206 through the front faces of the said castings. These openings function when sufficient coins have been deposited in the recesses 151 and 155 to entirely fill the same up to the runways 157 and 167 respectively. When these recesses are entirely filled, the coins pushed forwardly through the guideways by the plungers 158 and 169 will be discharged from the castings through the openings 205 and 206. The casting 143 is provided with a similar discharge opening 207 while the casting 144 is provided with a discharge opening 208. The plungers 177 and 179 for these two castings will function to discharge coins through the openings 208 and 207 respectively when the recesses 142 and 140 respectively are entirely filled with coins.

It has been seen that the prime mover 10 operates transmission mechanism, including a train of gears and the transmission shaft 17, for operating the two eccentrics 18 and 20. The deliverer 36 is driven by this transmission mechanism as well as the ejectors of the delivery mechanism and the various plungers forming part of the coin changing mechanism. It, of course, is desirable to provide a circuit for the prime mover 10 and suitable switches for this circuit.

One main supply wire 209 extends to a contact plate 210 which is supported by the insulator 211 carried by the member 72. This stationary contact 210 is associated with a movable contact 212 carried by the projecting end 79 of the controller shaft 78. It will be noted that the shaft 78 is not insulated from the casing and the remaining elements of the machine. This switch, made up of the relatively movable contacts 210 and 212, control the grounding of the circuit to the metallic elements of the machine. The second main supply wire 213 extends to one terminal 214 of the prime mover 10. The remaining terminal 215 of the prime mover has one wire 216 which is connected to contact plates 217. One of these contact plates is provided for each one of the ejector devices and is supported by an insulating block 218. The various contact blades 217 are all connected in series by the wire 216. This same prime mover terminal 215 is connected by the wire 219 to a contact blade 220 which is supported by an insulating block 221 secured to the base 6. This contact blade 220 cooperates with a metallic contact ring 222 secured to the perpendicular shaft 17. This contact block is formed with an insulated portion 223.

The operation of this circuit and its switches may be described as follows: The contact member 212, carried by the controller shaft 78, normally engages the stationary contact blade 210. The shaft 17 is normally positioned with the insulated portion 223 of the ring 222 underlying the contact blade 220. In view of this fact, no circuit is normally completed through this contact ring 222. The second wire 216 leading from the terminal 215 of the prime mover 10 normally is not connected to any metallic portion of the machine in view of the fact that the various ejector plungers 25 normally are positioned in vertical alignment with the storage portions 23 of the various compartments 21.

After proper coins have been deposited in the controller shaft 78 and the same is started to rotate by the customer, the contact is broken between the elements 210 and 212. Actuation of the controller shaft 78, however, has operated the selector mechanism and the proper ejector device has been set. The setting of the ejector device consists of the moving of the proper ejector plunger 25 from the position illustrated in Figs. 5 and 8 to the position illustrated in Fig. 7. This rearward movement of the ejector plunger 25 causes the ejector device to make contact with the blade 217 mounted on this storage compartment. The second side of the circuit to the prime mover, therefore, has been completed. Upon the return of the controller shaft 78 to its normal position, the contact elements 210 and 212 can engage each other and a complete circuit for the prime mover is made. This circuit includes the wire 209, the contacts 210 and 212, the entire metallic structure of the machine, the grounded contact blade 217 of the selected ejector device, the wire 216 which leads to the terminal 215 of the prime mover, the wiring of the prime mover, the second terminal 214 of the prime mover, and finally the second main supply wire 213. With the completion of this circuit, the prime mover starts to operate and its armature shaft rotates for driving the transmission mechanism. The perpendicular shaft 17 starts to rotate and the contact ring 222 is moved so that the insulated portion 223 of the ring is moved out from under the contact blade 220. This blade then engages the ring 222 and then acts as a second path for the current from the grounded machine to the prime mover terminal 215. As the deliveror rotates and the tray portion 38 of the same passes in front of the compartment from which an article is to be ejected, the ejector plunger 25 for this compartment moves forwardly to discharge one of the articles, as illustrated in Fig. 8. The forward movement of the ejector plunger 25 breaks the contact with its blade 217. The circuit, however, is not interrupted due to the fact that the blade 220 still engages the contact ring 222 carried by the shaft 17. The machine continues to operate until the insulated section 223 of the ring 222 again passes between the contact blade 220 and the ring. The circuit is then broken and the prime mover will stop. Breaking of the circuit in this manner assures the stopping of the various driven portions of the machine at a predetermined point after each operation.

It is believed that persons skilled in the art will be able to completely understand the operation of the various parts or mechanisms of this machine from the above detailed description. An attempt has been made to completely describe the operation of each one of the mechanisms while describing the same. No further explanation of the manner in which the machine operates, therefore, is believed to be necessary.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a dispensing machine of the type described, a plurality of storage compartments, means for selecting the compartment from which an article is to be dispensed, coin controlled means for ejecting an article from the selected compartment, and swingable means for delivering the ejected article to a discharge chute, said swingable means being timed to move by the selected compartment as the article is ejected.

2. In a dispensing machine of the type described, a plurality of storage compartments, means for selecting the compartment from which an article is to be dispensed, means for ejecting an article from the selected compartment, and swingable means for delivering the ejected article to a discharge chute, said swingable means being timed to move by the selected compartment as the article is ejected.

3. In a dispensing machine of the type described, a plurality of storage compartments, means for selecting the compartment from which an article is to be dispensed, and coin controlled delivery mechanism for withdrawing an article from the selected compartment and placing it in a discharge chute, said delivery mechanism including swingable conveyor means movable successively past the compartments, and an ejector operatively connected to the swingable means to operate in timed relation thereto.

4. In a dispensing machine of the type described, a plurality of storage compartments, means for selecting the compartment from which an article is to be dispensed, an ejector device for each compartment, coin controlled means for moving to a set position the ejector device for only the compartment from which an article is to be dispensed, means for delivering the ejected article to a discharge chute, power means for moving the set ejector device to eject the article and the delivery mechanism, and means for controlling the power means.

5. In a dispensing machine of the type described, a plurality of storage compartments, an ejector device for each compartment, control means for the ejector devices whereby the compartment from which an article is to be dispensed may be selected, coin controlled means for moving the ejector device for the selected compartment only to a set position, means for delivering the ejected article to a discharge chute, power means for operating the set ejector device and the delivery mechanism and means for controlling the power means.

6. In a dispensing machine of the type described, a plurality of storage compartments, an ejector device for each compartment, means for selecting the compartment from which an article is to be dispensed, coin controlled means for moving the ejector device for the selected compartment only to a set position, swingable means for delivering the ejected article to a discharge chute, power means for operating the set ejector device and the delivery means, and means for controlling the power means.

7. In a dispensing machine of the type described, a plurality of storage compartments, an ejector device for each compartment, means for selecting the compartment from which an article is to be dispensed, coin controlled means for moving only the ejector device for the selected compartment to a set position, means for delivering the ejected article to a discharge chute, power means for operating the set ejector device and the delivering means, and means operated by the coin controlled means and the selected ejector device for controlling the power means.

8. In a dispensing machine of the type described, a plurality of storage compartments, an ejector device for each compartment, control means for the ejector devices whereby the compartment from which an article is to be dispensed may be selected, means for moving the ejector device for the selected compartment from a position beneath to a set position behind the article to be ejected, coin controlled mechanism for operating the ejector setting means, means for operating the said ejector device, and means for delivering the ejected article.

9. In a dispensing machine of the type described, a plurality of storage compartments, an ejector device for each compartment, means for selecting the compartment from which an article is to be dispensed, means for moving the ejector device only for the compartment from which an article is to be dispensed to set position, coin controlled mechanism for operating the ejector setting means, means for delivering the ejected article, an electric motor for operating the set ejector device and the delivery means, a circuit for said electric motor, and circuit closing means operated by the coin controller mechanism.

10. In a dispensing mechanism of the type described, means for housing a plurality of different kinds of articles, means for selecting the kind of article desired, means for discharging from the housing means one article of the kind selected, swingable means for receiving the discharged article as it passes the housing means and carrying it to a delivery chute, means for timing the operation of the discharge means to the movement of the swingable means, means for transferring the article from the swingable means to the delivery chute, and means for operating the swingable means.

11. In a dispensing machine of the type described, means for housing a plurality of different kinds of articles, said housing means having a separate discharge opening for each kind of article, an ejector device for each of the discharge openings, swingable means successively movable past all of said discharge openings to receive articles ejected therefrom and past a discharge chute to deliver the ejected articles thereto, means for removing articles from the swingable means into said discharge chute, and means for operating the swingable means.

12. In a dispensing mechanism of the type described, means for housing a plurality of different kinds of articles, said housing means having a separate discharge opening for each kind of article, an ejector device for each of the discharge openings, means for selecting the ejector device to be operated, means for operating the selected ejector device, swingable means movable successively past all of said discharge openings to receive articles therefrom and past a discharge chute to deliver the articles thereto, means for removing articles from the swingable means into said discharge chute, and means for operating the swingable means.

13. In a dispensing mechanism of the type described, means for housing a plurality of different kinds of articles, said housing means having a separate discharge opening for each kind of article, an ejector device for each of the discharge openings, means for selecting the ejector device to be operated, coin controlled means for setting the selected ejector device, means for operating the set ejector device, swingable means movable past all of said discharge openings to receive articles therefrom and past a discharge chute to deliver the articles thereto, means for operating the swingable means and means for removing articles from the rotatable means into said discharge chute.

14. In a dispensing machine of the type described, a plurality of storage compartments, delivery mechanism for removing the articles from the compartments and delivering them to the customers, mechanism for controlling the delivery of the articles from the various compartments at a predetermined time during each operation of the machine, coin controlled mechanism for actuating the aforementioned mechanism, and means for operating the delivery mechanism controlled in starting and in stopping by the coin controlled mechanism and by the delivery mechanism.

15. In a dispensing machine of the type described, a plurality of article storage compartments, delivery mechanism for removing the articles from the compartments and delivering them to the customers including coin control ejector mechanism for each compartment, selector mechanism for controlling the delivery of the articles from the various compartments, coin changing mechanism for receiving the coin or coins handled by the coin controlled mechanism and for delivering to the customer change equal in value to the difference between the purchase price of the delivered article and the value of the coin or coins deposited in the machine, a prime mover for operating both the delivery mechanism and the coin changing mechanism, and means for controlling the prime mover.

16. In a dispensing machine of the type described, a plurality of article storage compartments, delivery mechanism for removing the articles from the compartments and delivering them to the customers, including coin controlled ejector mechanism for each compartment, selector mechanism for controlling the delivery of the articles from the various compartments, and coin changing mechanism for receiving the coin or coins handled by the coin controlled mechanism, storing said coins according to their respective values, for delivering to the customer change equal in value to the difference between the purchase price of the delivered article and the value of the coin or coins deposited in the machine, and a common actuating means for the delivery mechanism and the coin changing mechanism.

17. In a dispensing machine of the type described, a plurality of storage compartments, an ejector device for each compartment, means for selecting the compartment from which an article is to be dispensed, means for setting the ejector device for the selected compartment, means for delivering the selected article, and a single means for operating both the selected ejector device and the delivering means.

18. In a dispensing machine of the type described, a plurality of storage compartments, an ejector device for each compartment, means for selecting the compartment from which an article is to be dispensed without effecting bodily movement of the compartments, coin controlled means for causing movement of the ejector device for the selected compartment and one article therein from unset to set positions, and means for operating the selected ejector device to eject the set article by returning the device to its unset position.

19. In a dispensing machine of the type described, a plurality of storage compartments, a normally unset ejector device for each compartment, means for selecting the compartment from which an article is to be dispensed without effecting bodily movement of the compartments, means for setting the ejector device for the selected compartment, coin controlled means for preventing setting the ejector device until a coin or coins of proper value have been deposited, and means for operating the selected ejector device.

20. In a dispensing machine of the type described, a plurality of storage compartments, an ejector device for each compartment unset at the time of starting each operation of the machine, means for selecting the compartment from which an article is to be dispensed without effecting bodily movement of the compartments, coin controlled means for setting the ejector device for the selected compartment, means for preventing operation of the last mentioned means until a coin or coins of proper value have been deposited, and means for operating the selected ejector device.

21. In a dispensing machine of the type described, a plurality of storage compartments, an ejector device for each compartment, means for selecting the compartment from which an article is to be dispensed, means for setting the ejector device for the selected compartment to effect positioning of an article in said compartment in readiness to be delivered, means for delivering the selected article, a shaft for operating both the selected ejector device and the delivering means, and power means for operating said shaft.

22. In a dispensing machine of the type described, a plurality of storage compartments, a normally unset ejector device for each compartment, means for selecting the compartment from which an article is to be dispensed without effecting bodily movement of the compartments, coin controlled means for setting the the ejector device for the selected compartment to effect positioning of an article in the compartment in readiness to be delivered, and means for operating the selected ejector device.

23. In a dispensing machine of the type described, a plurality of storage compartments, a normally unset ejector device for each compartment, means for selecting the compartment from which an article is to be dispensed without effecting bodily movement of the compartments, means for setting the ejector device for the selected compartment to effect positioning of an article in said compartment in readiness to be delivered, coin controlled means for preventing setting the ejector device until a coin or coins of proper value have been deposited, and means for operating the selected ejector device.

24. In a dispensing machine of the type described, a plurality of storage compartments, a normally unset ejector device for each compartment, means for selecting the compartment from which an article is to be dispensed without effecting bodily movement of the compartments, a coin controlled means for setting the ejector device for the selected compartment only to effect positioning of an article in said compartment in readiness to be delivered, means for preventing setting of the last mentioned means until a coin or coins of proper value have been deposited, and means for operating the selected ejector device.

25. In a dispensing machine of the type described, a plurality of storage compartments, an ejector device for each compartment, means for selecting the compartment from which an article is to be dispensed, means for setting the ejector device for the selected compartment, means for delivering the selected article, mechanism for connecting the ejector devices and the delivering means, and a single power means for operating said mechanism.

26. In a dispensing machine of the type described, a plurality of storage compartments, an ejector device for each compartment, means for selecting the compartment from which an article is to be dispensed, means for manually setting the ejector device for the selected compartment as an incident to controlling the starting of the machine, means for delivering the selected article, means for operating the selected ejector device, and a single means for operating both of the last mentioned means.

27. In a dispensing machine of the type described, a plurality of storage compartments, an ejector device for each compartment, means for selecting the compartment from which an article is to be dispensed, means for setting the ejector device for the selected compartment as an incident to the starting of the operation of the machine, swingable means for receiving the ejected article and delivering it to the customer, means for actuating the set ejector, and means for operating the last two mentioned means in proper timed relation with respect to each other so that the swingable delivery means will pass the selected compartment as an article is ejected therefrom.

28. In a dispensing machine of the type described, a plurality of storage compartments, a movable ejector device for each compartment normally positioned beneath the articles in the compartments, means for selecting the compartment from which an article is to be dispensed, manual means for setting the ejector device for the selected compartment by moving it to a position rearwardly of one of the articles in the compartment, said last mentioned means being operated as an incident to the starting of the operation of the machine, means for delivering the selected article, means for returning the ejector device of the selected compartment to its initial unset position for the purpose of ejecting the selected article, and a single means for operating both of said last mentioned means.

29. In a dispensing machine of the type described, a plurality of storage compartments, an ejector for each compartment, spring means for moving each ejector to a set position, a latch device for each ejector to hold the same in an unset position, manual means for selecting the ejector device to be operated, additional manual means for actuating the latch device of the selected ejector to permit the spring for said ejector to move the latter into its set position, means for delivering the selected article, means for actuating the set ejector, and a single means for operating both the last mentioned means.

30. In a dispensing machine of the type described, a plurality of storage compartments, an ejector for each compartment, spring means for moving each ejector to a set position, a latch device for each ejector to hold the same in an unset position, manual means for selecting the ejector device to be operated, coin controlled means for actuating the latch device of the selected ejector to permit the spring for said ejector to move the latter into its set position, means for delivering the selected article, means for actuating the set ejector and a single means for operating both the last mentioned means.

ANDREW F. MICHLUN.